Oct. 27, 1959  W. D. GILES  2,910,128
STRUCTURAL BOX FOR FARMING
Filed Sept. 28, 1955  3 Sheets-Sheet 1
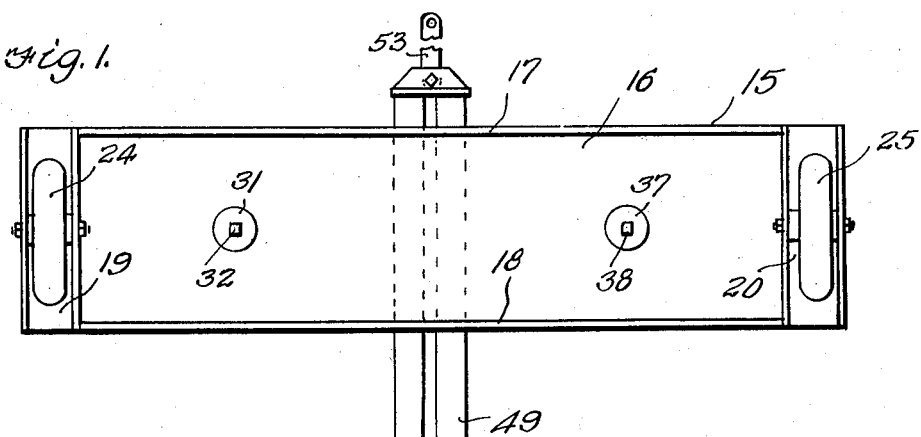
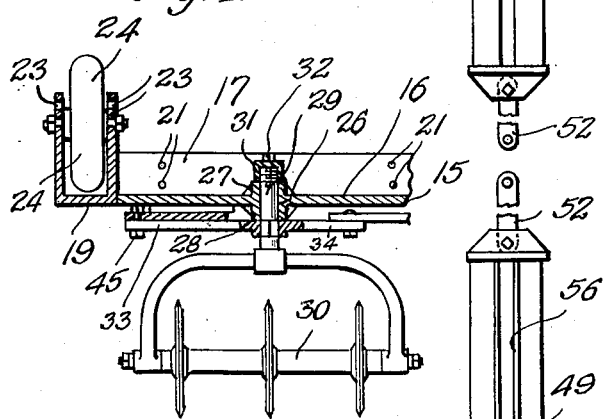
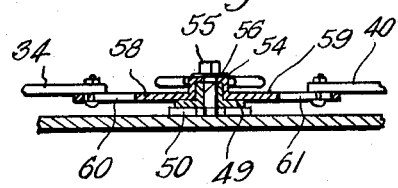
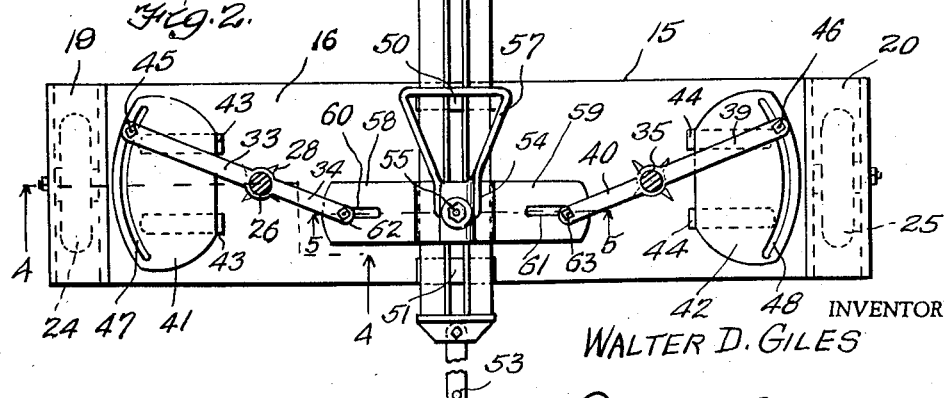
INVENTOR
WALTER D. GILES
BY
HIS ATTORNEY Oct. 27, 1959    W. D. GILES    2,910,128
STRUCTURAL BOX FOR FARMING
Filed Sept. 28, 1955    3 Sheets-Sheet 2
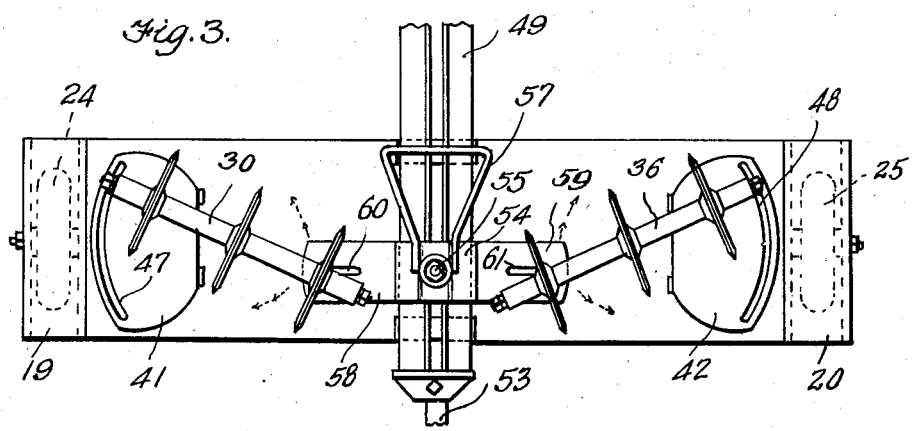
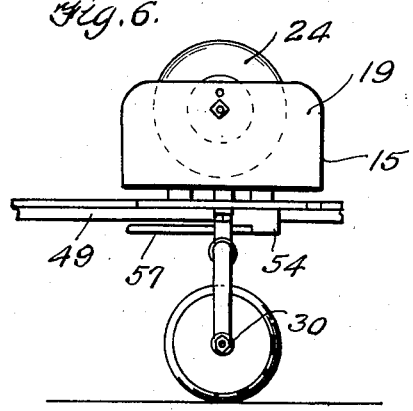
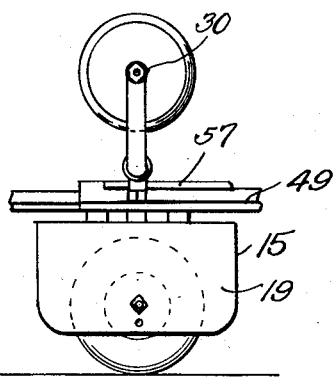
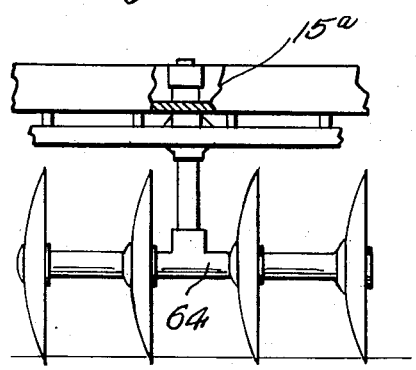
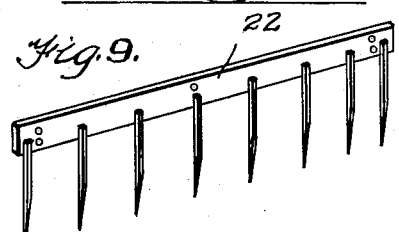
INVENTOR
WALTER D. GILES
BY
HIS ATTORNEY Oct. 27, 1959   W. D. GILES   2,910,128
STRUCTURAL BOX FOR FARMING
Filed Sept. 28, 1955   3 Sheets-Sheet 3

INVENTOR
WALTER D. GILES
BY
HIS ATTORNEY

United States Patent Office 2,910,128
Patented Oct. 27, 1959

2,910,128

STRUCTURAL BOX FOR FARMING

Walter D. Giles, Paradis, La.

Application September 28, 1955, Serial No. 537,216

1 Claim. (Cl. 172—34)

This invention relates to a structural box for farming, and has for one of its objects the production of a simple and efficient box which may be constructed at a minimum cost and which may be used for many purposes in conjunction with a tractor or the like.

A further object of this invention is the production of a simple and efficient box which may be used as a trailer or as a means for attaching various farm implements to a tractor.

Other objects and advantages of the present invention will appear throughout the following specification and claims.

In the drawings:

Figure 1 is a top plan view of the box;

Figure 2 is a bottom plan view thereof, the implement supporting shafts being shown in transverse section;

Figure 3 is a bottom plan view of the box with the disc harrows or implements in place;

Figure 4 is a fragmentary longitudinal sectional view taken on line 4—4 of Figure 2;

Figure 5 is a fragmentary sectional view taken on line 5—5 of Figure 2;

Figure 6 is a fragmentary end view showing the box used as a disc harrow;

Figure 7 is a fragmentary end view in an inverted position, showing the box being used as a trailer or vehicle for transporting the disc harrow;

Figure 8 is a fragmentary rear elevational view of the box showing a disc harrow gang secured thereto;

Figure 9 is a perspective view of a tooth carrying plate which is adapted to be secured to the front and rear faces of the box;

Figure 10 is an end elevational view showing the tooth carrying plate secured to the front and rear faces of the box;

Figure 12 is a rear elevational view showing the box used as a drag to flatten out stalks and the like;

Figure 11:
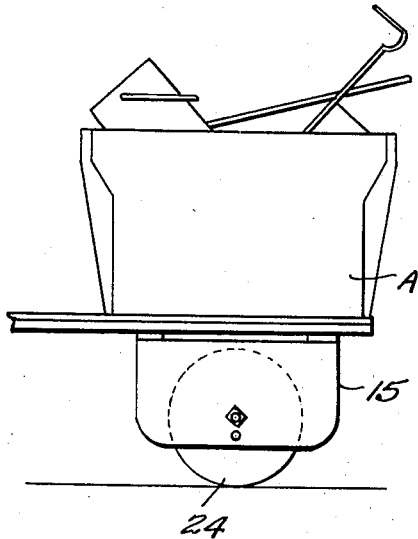
Figure 11 is a side elevational view showing the box used as a carrier for a cart body.

By referring to the drawings in detail it will be seen that 15 designates the structural box which is preferably formed of steel. The box 15 comprises a bottom 16, an upturned front flange 17, and an upturned rear flange 18. Inverted U-shaped end casings 19 and 20 are welded to the ends of the bottom 16, and the ends of the flanges 17 and 18, to provide a simple assembly. Suitable apertures 21 are formed in the flanges 17 and 18 to facilitate the attachment of a toothed carrying plate 22 to the box when desired. The casings 19 and 20 are preferably provided with vertically aligned apertures, such as the apertures 23 shown in Figure 4, to receive the axle bolts of the wheels 24 and 25. These apertures will facilitate the adjustable attachment of the wheels to the box in a selected position.

The bottom 16 of the box 15 is provided with two implement shaft receiving apertures such as the aperture 26 shown in Figure 4, having shoulders 27 and 28 protruding from the upper and lower faces thereof. An implement shaft is adapted to extend through each aperture in the bottom of the box such as the shaft 29 shown in Figure 4. A suitable implement, such as the harrow disc gang 30 is carried by the shaft 29, and it should be understood that various types of implements may be substituted for the disc gang 30 within the scope of the invention. Each implement, however, must be provided with a shaft such as the shaft 29 shown in Figure 4, to fit through the aperture 26 for attachment to the box 15. As shown, the shaft 29 carries a cap 31 acting as a grease cup, which is threaded upon the top of the shaft 29 and abuts the shoulder 27 and secures the shaft in place. A suitable locking tap screw 32 also locks the cap against accidental displacement. A pair of radiating arms 33 and 34 are fixed to the shaft 29 and abut the shoulder 28 at their junction with the shaft 29 to lock the shaft against upward movement through the aperture 26.

The companion shaft 35 for the companion disc gang 36 is constructed in the same manner as described with respect to the shaft 29 and disc gang 30. In other words, the parts are duplicates as to structure. A cap 37 engages the top of the shaft 35 and is locked in place by a locking tap screw 38. The shafts 26 and 35 are in alignment with the longitudinal center of the box 15, as shown in Figure 2. The shaft 35 is provided with radiating arms 39 and 40 similar to the arms 33 and 34.

Guiding plates 41 and 42 are fixed to the bottom 16 of the box 15 by means of spacer cleats 43 and 44 respectively, to space the plates from the under face of the bottom 16 to facilitate reaching the bolts 45 and 46 with a wrench between the plates and the bottom of the box while adjusting the bolts. These bolts pass through the respective arc slots 47 and 48 of the respective plates to lock the arms 33 and 39 in a set position relative to the plates 41 and 42.

A central draw or channel bar 49 is fixed to the under face of the bottom 16 of the box 15 by means of spacer cleats 50 and 51 to provide a clearance and to space the bar 49 from the bottom of the box. Coupler links 52 and 53 are carried by the respective ends of the draw bar 49. An adjusting plate 54 is slidably mounted on the draw or channel bar 49, and an anchoring bolt 55 anchors the adjusting plate 54 in a selected adjusted position by passing through the channel 56 of the bar 49 and engaging the under face of the bar 49. A handle bar 57 is fixed to the plate 54 to facilitate the movement of the plate 54 to and from a selected position when desired. The plate 54 is provided with lateral fins 58 and 59 which project laterally of the bar 49. These fins 58 and 59 are provided with longitudinal slots 60 and 61 to receive connecting bolts 62 and 63 respectively, and to adjustably secure the arms 34 and 40 to the fins 58 and 59 respectively.

From the foregoing description, it will be seen that by pushing or pulling upon the handle 57, the angle of the disc harrow gangs may be changed to a selected position, and they may be then locked by securing the bolts 45, 46 and 55, to hold the parts in a set position. The box may be used in the position shown in Figure 6 when using the disc harrow gang, and the gang may be set at a suitable angle or may be set to extend longitudinally of the box in the manner shown. When it is desired to transport the box from place to place, the box 15 may be inverted to the position shown in Figure 7 so that the wheels 24 and 25 contact the ground.

As is shown in Figure 8, a disc harrow gang such as is indicated at 64, may be secured to the box 15a, since it is not desired to limit the invention to any particular type of implement which may be attached to the box.

Figure 12:
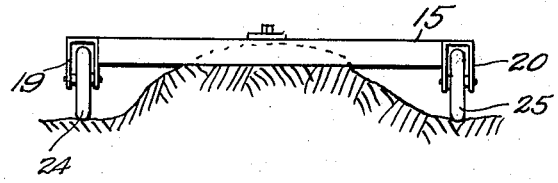
Figure 13:
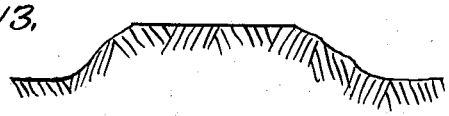
Figure 13 is a transverse sectional view showing the appearance of a row after scraping and flattening by means of the box as shown in Figure 12.

By referring to Figure 11, it will be seen that the box 15 may be used as a carrier for a cart body or trailer box A, which may be loaded with tools and equipment to be carried from the field. In Figure 12, the box 15 is shown as being used for flattening out stalks, or the tops of hills, by using the box 15 as a drag.

It should be noted that the structural box provides the farmer with an apparatus which will do the work of many implements, thereby saving money and time. When the structural box is used as a disc harrow, weights or articles having weight may be placed in the box 15 to bury the discs at a selected depth for deep cutting or deep soil treatment. When throwing up rows with a turning plow, the rows must be flattened for seeding, thereby requiring a special implement for this purpose. With the present invention, however, the box 15 is so constructed that by means of the vertically aligned apertures 23 at the ends of the box 15, the box may be inverted and set to straddle the row to knock off as much of the top as desired by adjusting the wheels in the proper holes to give the desired height. The box, when inverted may be used as a drag to flatten rows of soil for seeding, by moving the wheels 24 and 25 out of contact with the soil. The present apparatus therefore constitutes a combination box designed as a single apparatus which may be used to cultivate, as a trailer, an apparatus to throw up rows, and as a means to receive tools that are required to cultivate the soil. In other words, this apparatus will do the work of many implements. The disc harrow constitutes a weighted stabilizer, when the box is inverted to selectively hold the box in scraping contact with the soil or at stabilized height above the soil.

It should be understood that after the soil is broken up and harrowed, and it is desired to throw up rows, instead of using a turning plow, the disc harrows are secured to the box 15 and set at a desired angle, such for instance as shown in Figure 3 and anchored in place. This arrangement will throw up rows, or the disc harrows may, if desired, be set at right angles to throw the soil away from the plants.

In carrying out the invention, the soil is first disc harrowed. Then the discs are inverted and the teeth of tooth plates 22 which are secured to the box 15 are used to further cultivate the soil. The tooth plates 22 are removed and the box 15 may be used as a drag for leveling.

It should be further understood that certain detail changes or arrangements of parts may be employed without departing from the spirit of the invention, so long as such changes fall within the scope of the appended claim.

Having described the invention, what I claim as new is:

The combination of a structural box with a soil treating implement located below said box, said box having a closed bottom and an open top and constituting a recessed container for receiving articles having weight for burying said soil treating implement at a selected depth into the soil for deep soil treatment, wheels vertically adjustable upon said box, said box and implement being adapted to be inverted, said wheels being vertically adjustable to selectively bring said inverted box into contact with the soil for use as a drag and at a selected height above the soil to knock off portions of growing crops at a selected height above the soil, the weight of the soil treating element constituting a weighted stabilizing means when said box is inverted to selectively hold the box in scraping contact with the soil and at a stabilized height above the soil, said last mentioned means comprising a guiding plate fixed to and spaced from the bottom of said support, each plate having an arc slot formed therein, and a locking bolt carried by said arm and fitting through said arc slot in said guiding plate.

References Cited in the file of this patent

UNITED STATES PATENTS

| | | |
|---|---|---|
| 407,463 | Ansley | July 23, 1889 |
| 1,411,196 | Smith | Mar. 28, 1922 |
| 1,421,047 | Ward | June 27, 1922 |
| 1,817,851 | Shelton | Aug. 4, 1931 |
| 1,884,273 | Sandeen | Oct. 25, 1932 |
| 2,109,098 | Baxter | Feb. 22, 1938 |
| 2,193,009 | Riggs | Mar. 12, 1940 |
| 2,335,112 | Fulks | Nov. 23, 1943 |
| 2,431,959 | Olson | Dec. 2, 1947 |

FOREIGN PATENTS

| | | |
|---|---|---|
| 151,316 | Australia | May 7, 1953 |
| 874,376 | Germany | Apr. 23, 1953 |